United States Patent [19]

Lallement

[11] Patent Number: 4,927,678
[45] Date of Patent: May 22, 1990

[54] PROTECTIVE BELLOWS PARTICULARLY FOR A MOTOR VEHICLE FRONT WHEEL DRIVE

[75] Inventor: Serge Lallement, La Chapelle S/erdre, France

[73] Assignee: Compagnie Des Products Industriels de l'Ouest (C.P.I.O.), Carquefou, France

[21] Appl. No.: 278,470

[22] Filed: Dec. 1, 1988

[30] Foreign Application Priority Data

Dec. 1, 1987 [FR] France ................... 87 16631

[51] Int. Cl.$^5$ .............................. F16D 3/84
[52] U.S. Cl. ......................... 428/36.9; 464/175
[58] Field of Search ............... 464/173, 175; 428/36.9

[56] References Cited

U.S. PATENT DOCUMENTS

| | | | |
|---|---|---|---|
| 2,761,295 | 9/1956 | Davis | 464/175 |
| 3,817,057 | 6/1974 | Orain | 464/175 |
| 4,083,202 | 4/1978 | Westercamp | 464/175 |
| 4,496,334 | 1/1985 | Mikeska | 464/175 |
| 4,718,680 | 1/1988 | Halronruy et al. | 464/175 |

FOREIGN PATENT DOCUMENTS

| | | |
|---|---|---|
| 2714983 | 10/1978 | Fed. Rep. of Germany . |
| 2933695 | 4/1981 | Fed. Rep. of Germany . |
| 1226861 | 2/1960 | France . |
| 1474969 | 2/1967 | France . |
| 2172580 | 9/1973 | France . |
| 2424438 | 11/1979 | France . |
| 2107412 | 4/1983 | United Kingdom . |

Primary Examiner—James Seidleck
Attorney, Agent, or Firm—Oblon, Spivak, McClelland, Maier & Neustadt

[57] ABSTRACT

Disclosed is a protective bellows of polymer material of the thermoplastic, silicon, etc. type, particularly for a motor vehicle front wheel drive. It has a profile which includes a conical part (5) fastened to the bowl (3) of the transmission, extended on the opposite side by a cylindrical part (7) whose free end is fixed with the wheel side of the drive shaft (4).

6 Claims, 1 Drawing Sheet

PROTECTIVE BELLOWS PARTICULARLY FOR A MOTOR VEHICLE FRONT WHEEL DRIVE

BACKGROUND OF THE INVENTION

1. Field of the Invention

This invention relates to a new protective bellows for universal joints, particularly for front wheel drives of motor vehicles and further to a protective element of polymer material for universal joints, transmission side, such as thermoplastic, silicone, etc.

2. Discussion of the Background

The increasingly frequent use of catalytic converters on motor vehicles raises a new problem concerning the behavior at high temperature of a bellows which may be located near by.

The use of materials of the silicone type, for example, makes it possible for the bellows to withstand an increase in temperature due to heat radiation. Nevertheless, these materials with a low modulus of elasticity remain unstable when undergoing centrifugal forces. This involves a new geometry able to to withstand the combined conditions of high temperatures and high rotational speeds.

SUMMARY OF THE INVENTION

In contrast with the wheel side bellows, the present invention is not subject to a steering lock angle, but only possible oscillations on the order of + or −20°.

In addition, the absence of a "tulip" makes possible a very compact design, assuring for it a significant savings of grease weight and an excellent dynamic stability, regardless of the flexibility of the material.

This invention has as its object to solve the problems mentioned above, relative to high temperatures and resultant stresses of undergoing a centrifugal force, while respecting the operational necessities of the drive mechanism.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENT

Figure 1:
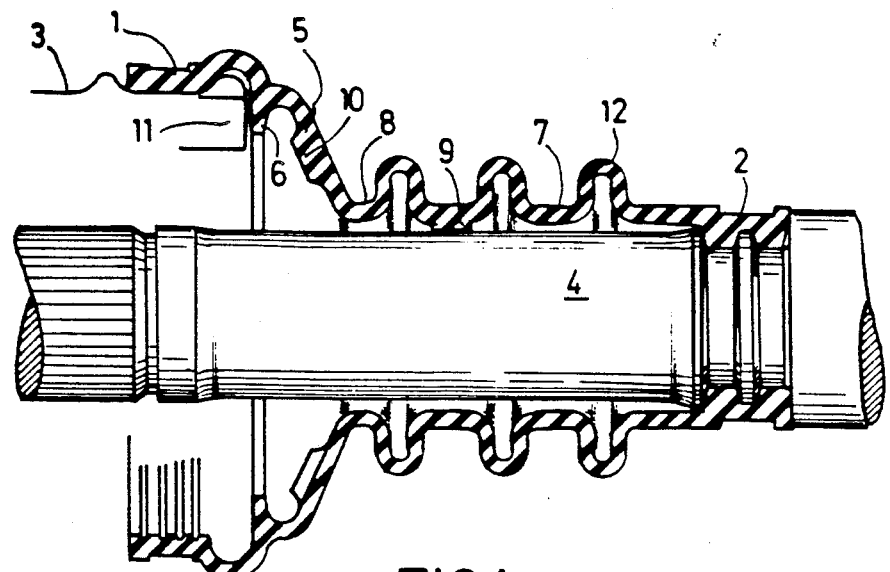
FIG. 1 is a longitudinal section of the bellows of the invention in position on the drive shaft.
Figure 2:
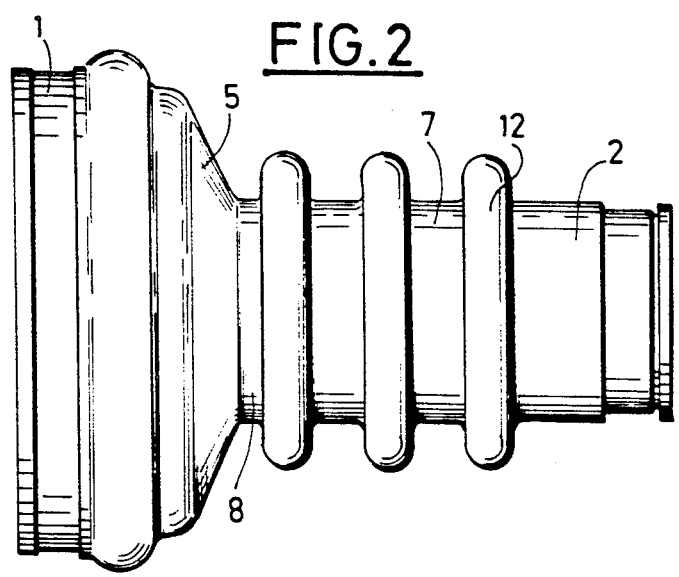
FIG. 2 is an exterior view of the bellows of the invention.

With reference to FIG. 1, it is seen that the geometry of the bellows is defined to assure the following points:
Each of its ends 1-2 comprises profiles suited respectively to the surfaces of bowl 3 and shaft 4 of the drive on which it is mounted without prestressing.
Between these two ends, the profile of the bellows is subdivided into two distinct parts:
part 5 being conical,
the other part 7 being cylindrical.

Conical part 5, whose wall in a variant can be vertical, assures the joining of the bowl 3 side securing zone with cylindrical part 7 of the bellows. Near bowl 3, it assures a minimal volume of grease. The fact that the wall of the conical part 5 forms an angle between 0° and 25° determines an optimal behavior in centrifuging. To the right of bowl 3, a rib 6 is provided whose purpose is to protect conical zone 5 in view of the internal aggressiveness of a sheet metal hood. It also makes it possible to better position the bellows on bowl 3 by acting as a stop and contributes to increasing the rigidity in this part.

Conical element 5 can optionally be reinforced by a circular boss 10 so that it is protected from the outside edges of a "three-lobed tulip" 11. At the base of cone 5, a hinge zone 8 assures the cone-cylinder junction. The free space of the drive serves for articulation for the bellows in this part 8. This latter, itself, rests on smooth and lubricated shaft 4 of the drive.

Cylindrical section 7 of the bellows has an inside diameter on the order of 4 mm greater than the outside diameter of shaft 4. This design makes it impossible for the bellows to become destabilized at high speed since it is supported by shaft 4 on the inside.

In addition, it is possible to add guide lugs 9 that rest on lubricated shaft 4 which cause no damage to the bellows. The volume of grease in the cylindrical part 7 remains very low.

To make possible the necessary axial movement for the bellows on the side of the transmission, small folds 12 are added whose outside diameter does not exceed twice that of shaft 4. In addition to this function, the above arrangement assures an increased rigidity over the entire length of cylindrical part 7 of the bellows. This design makes it possible to stabilize the latter regardless of its length.

Obviously, numerous modifications and variations of the present invention are possible in light of the above teachings. It is therefore to be understood that within the scope of the appended claims, the invention may be practiced otherwise than as specifically described herein.

I claim:

1. A protective bellows made of polymer material for a motor vehicle front wheel drive having a transmission with a bowl and a drive shaft, which comprises:
   a conical part to be fastened to said bowl of said transmission; and
   a cylindrical part having a substantially uniform diameter connected with said conical part wherein said cylindrical part includes a plurality of folds positioned along the length of said cylinder.

2. A protective bellows according to claim 1, wherein an inside diameter dimension of the cylindrical part does not exceed 4 mm greater than the diameter of the shaft.

3. A protective bellows according to claim 1, wherein an inside part of the cylinder has guide lugs for engaging said shaft.

4. A protective bellows according to claim 1, which comprises a junction between the conical part and the cylindrical part and which includes a fold which constitutes an articulated zone.

5. A protective bellows according to claim 1, wherein the conical part includes a circular protective boss.

6. A protective bellows according to claim 1, wherein the conical part includes a rib forming a protective member having local rigidity.

* * * * *